J. Robinson.
Butter Worker.
N° 55,714. Patented Jun. 19, 1866.
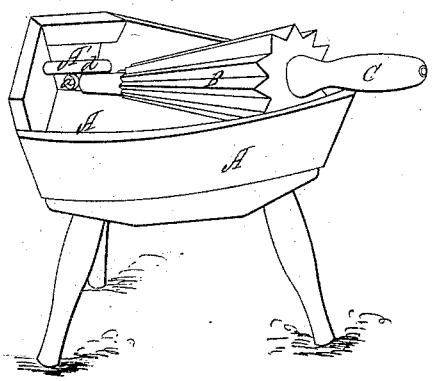
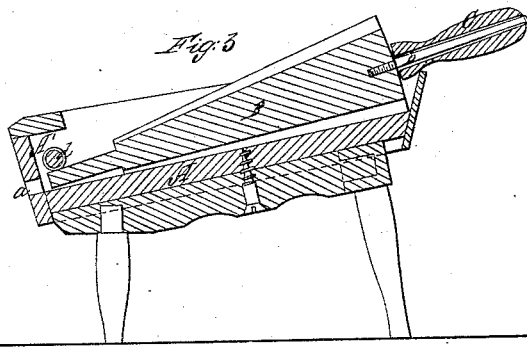
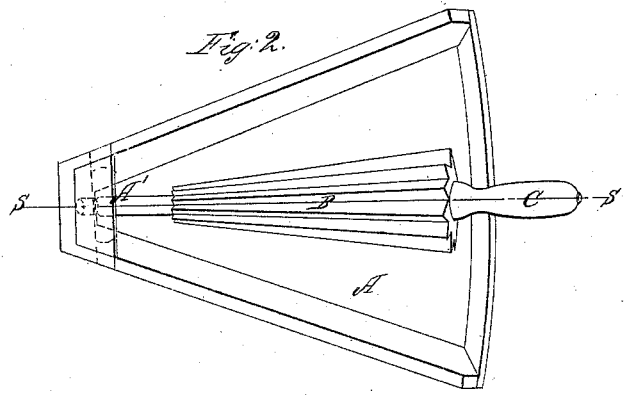
Witnesses:
Inventor:
John Robinson

UNITED STATES PATENT OFFICE.

JOHN ROBINSON, OF CALAIS, VERMONT.

IMPROVEMENT IN BUTTER-WORKERS.

Specification forming part of Letters Patent No. 55,714, dated June 19, 1866.

*To all whom it may concern:*

Be it known that I, JOHN ROBINSON, of Calais, in the county of Washington and State of Vermont, have invented certain new and useful Improvements in Machines for Working Butter, of which the following is a full and complete description, reference being had to the accompanying drawings, which form a part of this specification.

Figure 1 is a perspective view of the machine. Fig. 2 is a plan view. Fig. 3 is a section on the line S S in Fig. 2.

Similar letters indicate like parts in all the figures.

My invention relates to the butter-workers in which a roll is operated in a tray from side to side by hand.

Butter-workers having rollers operating by hand from side to side in a tray have been before known; but, by reason of imperfections in their construction and arrangement, the roll was liable to turn hard, or to refuse to turn at all, when the roll became thoroughly wet, and it required so much time and labor to introduce and remove the roll as to materially detract from its usefulness.

My invention is intended to remove these difficulties, and to enable others skilled in the art to make and use my invention, I will proceed to describe its construction and operation by the aid of the drawings and the letters of reference marked thereon.

A is a triangular or sector-shaped tray for holding the butter. It is composed of a platform or table mounted upon legs to bring it to a convenient height, and provided with sides to retain the butter and buttermilk.

B is a conical roller, of wood, and is grooved or fluted longitudinally. The fluting does not extend entirely to the small end, but the roll is shouldered or made suddenly smaller at a little distance from the small end, and extends from that point to the small end a smooth cylinder, as shown by Fig. 3.

The roller B is moved back and forth in the tray by the handle C, which turns loosely upon the pin $b$, screwed to the roller. The handle C is kept in position upon the shank or pin $b$ by an enlargement or head upon the end of the pin, as shown, and the pin is driven or screwed firmly into the center of the roller in a line with its axis.

In the angle A' of the tray is placed a cross-pin extending across from one side of the tray to the other, at a sufficient height to allow the small end of the roll B to be inserted freely beneath it. The tray is inclined downward toward the angle A', and a hole, $a$, is formed at the bottom at that point for the passage out of the buttermilk.

The butter is also salted in the machine, and the salt is worked into the butter in the same manner that butter is worked to remove the buttermilk, so that the entire operation of working, washing, and salting the butter is done in the machine.

The turning of the handle C upon the pin or shank $b$ allows the roller B to revolve freely without turning the handle; and as the handle does not come in contact with the water or moisture of the butter, there is no danger of its swelling so that it will not turn, which is liable to be the case where the handle is continued through the center of the roll and forms the shaft upon which the roll turns.

To remove the roll from the tray it is simply necessary to raise the handle C sufficiently to bring the large part of the roll B above the side or edge of the tray, when it may be readily slipped from beneath the pin $d$ and removed. One hand only is necessary for the purpose. The reverse movement of the roller will place it in position in the tray.

It will be observed that the sides of the tray keep the small end of the roll in position laterally, and the end $A^2$ keeps it is position radially, while the cross-bar $d$ keeps it down near the bottom of the tray at that end as effectually as if it were pinned in a socket, but allowing it to be readily removed and replaced at pleasure without having to remove any pin or other fastening to the roll.

I do not confine myself to the fluted roller, as my invention can be worked with a plain conical roller.

Having now fully described my invention, what I claim as new therein, and desire to secure by Letters Patent, is—

The conical roller B $b$ and handle C, fitted so that the handle may turn upon the roller, in combination with a sector-shaped tray, A $A^2$, and cross-bar $d$, substantially in the manner and for the purpose herein set forth.

JOHN ROBINSON.

Witnesses:
 C. A. KENT,
 J. V. B. KENT.